United States Patent
Pagdin et al.

[15] 3,669,244
[45] June 13, 1972

[54] CONVEYOR

[72] Inventors: William Gordon Pagdin, Milwaukee; Walter I. Smith, Brookfield; Wayne A. Smith, Shorewood; Eugene F. Le Tendre, Sussex, all of Wis.

[73] Assignee: Jos. Schlitz Brewing Company

[22] Filed: Oct. 28, 1969

[21] Appl. No.: 870,033

[52] U.S. Cl................................198/137, 198/204
[51] Int. Cl...............B65g 15/00, B65g 17/00, B65g 19/00
[58] Field of Search....................................198/204

[56] References Cited

UNITED STATES PATENTS

| 2,253,761 | 8/1941 | Campbell | 198/204 |
| 2,599,659 | 6/1952 | Phillips et al | 198/204 X |
| 3,265,192 | 8/1966 | Stadelman | 198/204 |
| 3,292,772 | 12/1966 | Rice | 198/204 |

Primary Examiner—Gerald M. Forlenza
Assistant Examiner—Jerold M. Forsberg
Attorney—Andrus, Sceales, Starke & Sawall

[57] ABSTRACT

A conveying mechanism for conveying articles such as bottles or cans. The conveyor is fabricated from a series of modular sections connected together in a manner to provide precise alignment of the endless conveyor chains.

The endless conveyor chain is guided for movement on flexible plastic wear strips which are snapped into position on the guide tracks.

13 Claims, 15 Drawing Figures

PATENTED JUN 13 1972

INVENTORS
WILLIAM G. PAGDIN
WALTER I. SMITH
WAYNE A. SMITH
EUGENE F. LETENDRE

By
ATTORNEYS

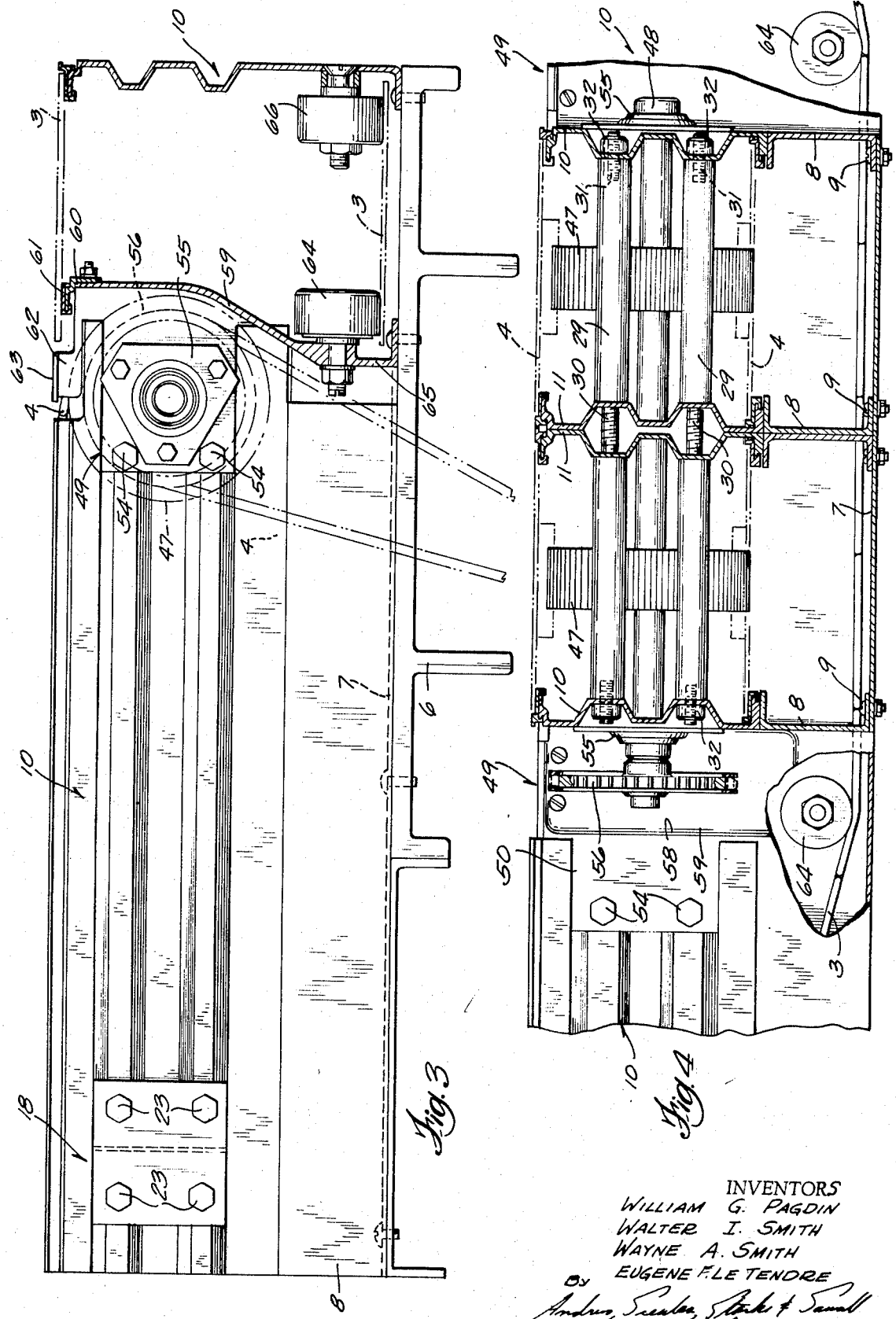

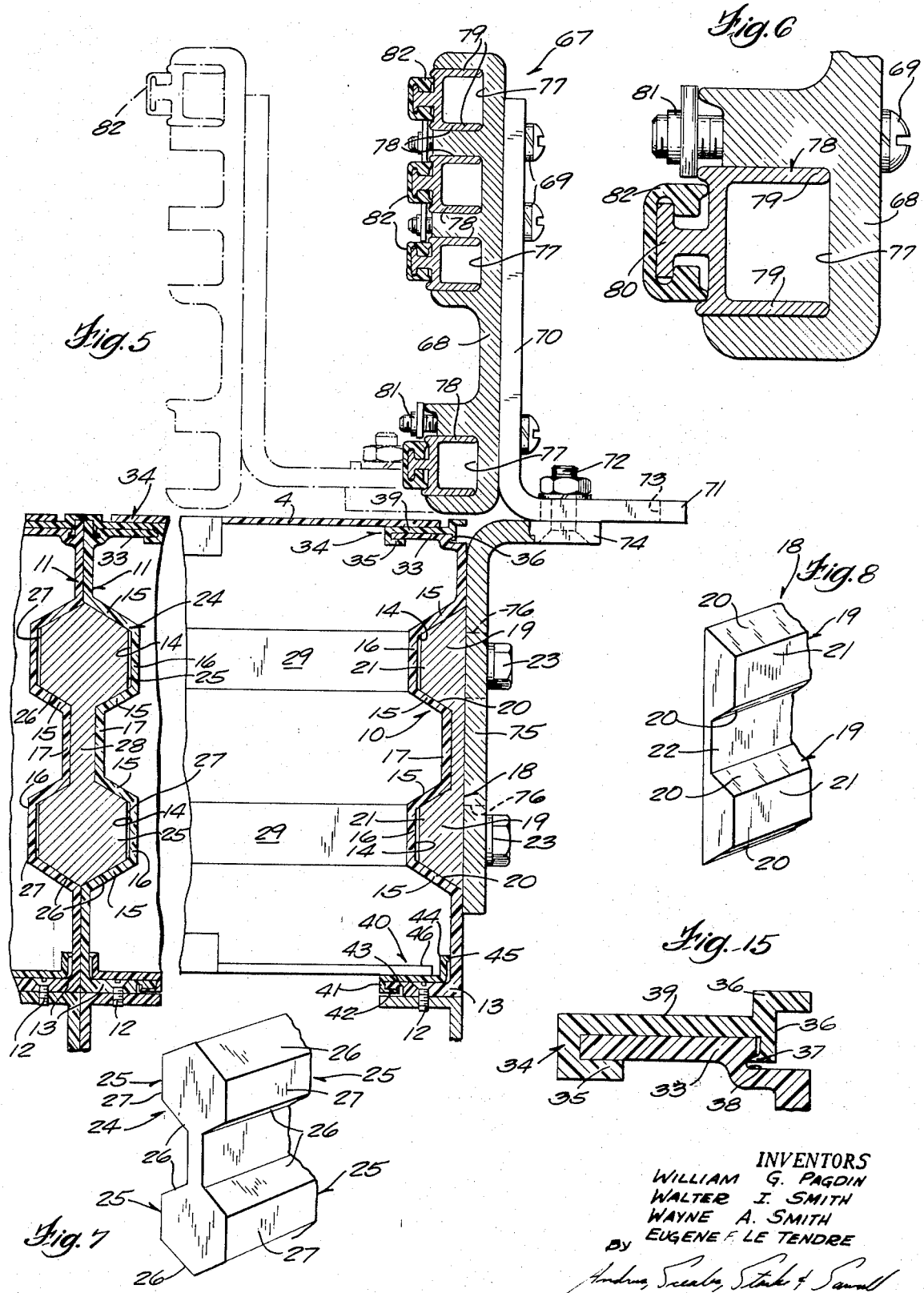

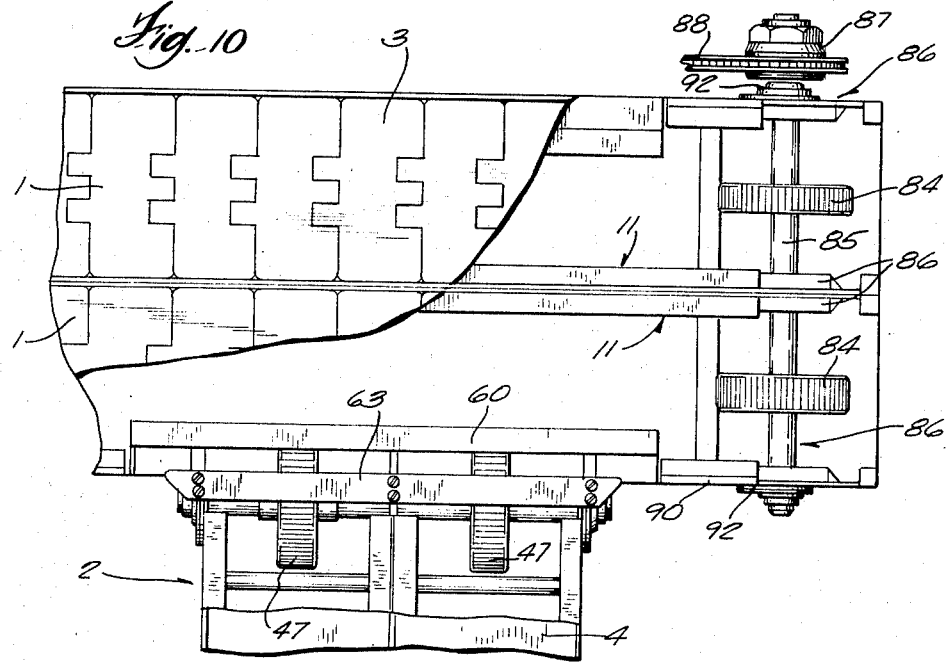
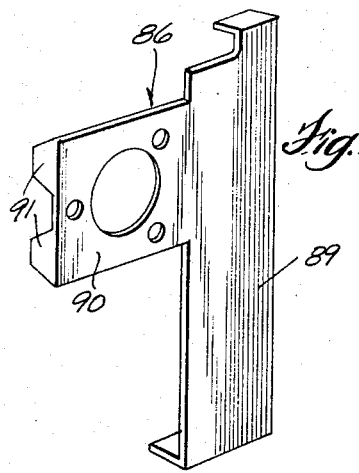
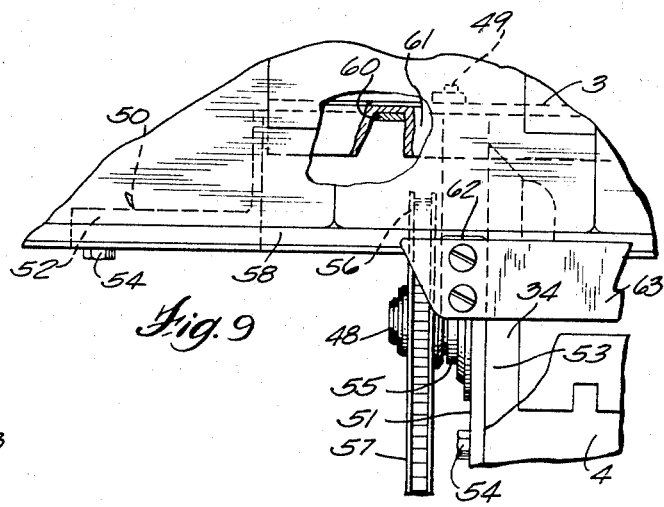
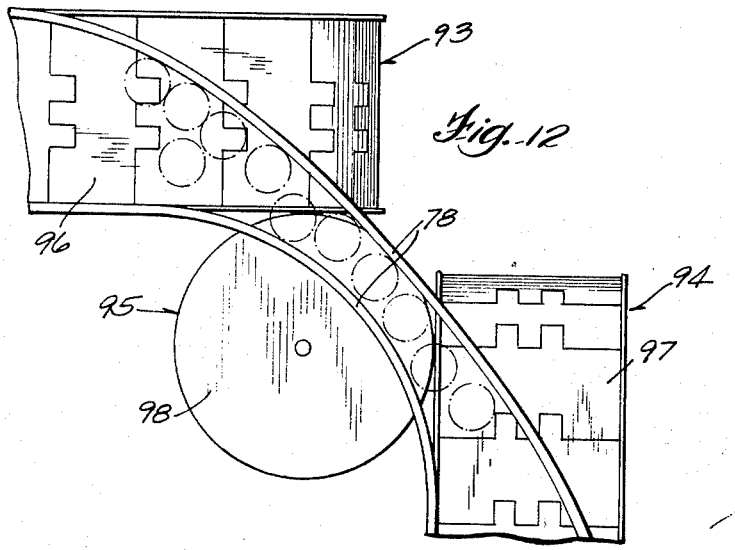
INVENTORS
WILLIAM G. PAGDIN
WALTER I. SMITH
WAYNE A. SMITH
EUGENE F. LE TENDRE
ATTORNEYS

CONVEYOR

The present invention relates to a conveying mechanism and more particularly to a conveyor for moving bottles or cans through a bottling plant.

In a typical bottling plant, such as a brewery, the bottles or cans are moved through the plant by a conveying mechanism composed of a number of conveyor sections, each of which includes a series of endless table-top conveyor chains and the bottles or cans travel on the chains in the desired path throughout the plant.

The present invention is directed to an improved conveyor mechanism which is particularly adaptable for conveying bottles or cans through a bottling plant. More specifically, each conveyor section comprises a pair of side walls having longitudinally extending grooves. The portions of the walls bordering the grooves are inclined so that the grooves have outwardly diverging walls. To connect the side walls of the conveyor sections in end-to-end relation, a connecting member is employed having lands or ridges which complement the grooves in the side walls. The connecting member is secured to the adjacent ends of the side walls and acts to precisely align the upper edges of the conveyor sections so that the conveyor chain can travel in a smooth path over the conveyor sections.

If one or more conveyor sections are to be assembled in a side-by-side relation, the adjacent side walls of the conveyor sections are secured in a back-to-back relation by a connecting member which complements and is received within the grooves in both of the back-to-back side walls. In this case, the connecting member not only acts to connect two pairs of conveyor sections in an end-to-end relation but also serves to connect one pair in side-by-side relation with the other pair.

In accordance with another aspect of the invention, the upper flanges of the side walls define supporting tracks for the conveyor chain, and flexible plastic wear strips are mounted on the support tracks by snapping the flexible strips over the edges of the tracks. The plastic strips provide wear surfaces for the track and can be readily removed and replaced for maintenance.

Where the conveyor system is in the form of a "T," in which one conveyor section is disposed normal to another conveyor section, corner brackets are utilized having angularly disposed arms, with each arm being provided with longitudinally extending lands which are received in the grooves in the side walls of both conveyor sections to thereby accurately align the conveyor sections at the junction.

In a second form of the conveyor system, a rotating disc is employed at the junction of two normally disposed conveyor sections to transfer the articles from one conveyor section to another. The disc is driven by a vertical shaft journalled within a casing located adjacent the conveyor sections and the casing is provided with a pair of flanges having lands which complement and are received with the grooves of the side walls of the two angularly disposed corner conveyor sections.

The conveying mechanism of the invention is fabricated of a series of modular sections which can be assembled to form either single, double, or multi-conveyor sections. The connecting structure precisely aligns the guide tracks of the conveyor sections, thereby eliminating "humping" which can result in the bottles or cans falling over on the conveyor.

The conveyor sections are preferably formed of aluminum extrusions and therefore the maintenance cost is substantially reduced over conventional conveyors. In addition, due to its modular nature, the conveyor can be assembled and disassembled in a substantially shorter period of time than conventional conveyors and this substantially reduces the overall cost of installation, as well as enabling the configuration of the conveyor system to be more readily changed.

The conveying mechanism of the invention also includes an inexpensive guide rail construction including plastic bumper strips which guide the bottles or cans on the conveyor. The bumper strips are adjusted laterally of the conveyor to thereby define the width of the conveying surface.

The plastic wear strips on which the conveyor chains ride are merely snapped into place on the metal guide tracks. This construction substantially reduces the labor cost necessary in installing and disassembling the wear strips. In a conventional conveying system, the wear strips are usually metal members which are connected to the guide tracks or supporting surface by a series of flathead screws countersunk into the strip. The present wear strips require no auxilliary fasteners and merely snap into place on the supporting track.

Other objects and advantages will appear in the course of the following description:

The drawings illustrate the best mode presently contemplated of carrying out the invention.

In the drawings:

FIG. 3 is a vertical section taken along line 3—3 of FIG. 1;

FIG. 4 is an enlarged transverse vertical section taken through a conveyor section;

FIG. 5 is an enlarged fragmentary vertical section showing the conveyor sections, wear strips and guide rails;

FIG. 6 is an enlarged fragmentary vertical section showing the details of the guide strip on the guide rail;

FIG. 7 is a fragmentary perspective view of a connecting member employed to connect the central walls of the conveyor sections together;

FIG. 8 is a fragmentary perspective view of a connecting member employed to connect the side walls of the conveyor sections together;

FIG. 9 is an enlarged fragmentary plan view with parts broken away showing the junction of the conveyor sections;

FIG. 10 is a plan view of a modified form of the invention;

FIG. 11 is a perspective view of one of the connecting members used in the conveyor of FIG. 10;

FIG. 12 is a plan view of a second modified form of the conveyor employing a rotating disc to transfer the articles from one conveyor section to another;

FIG. 15 is an enlarged sectional view showing the details of the plastic wear strips.

Figure 1:
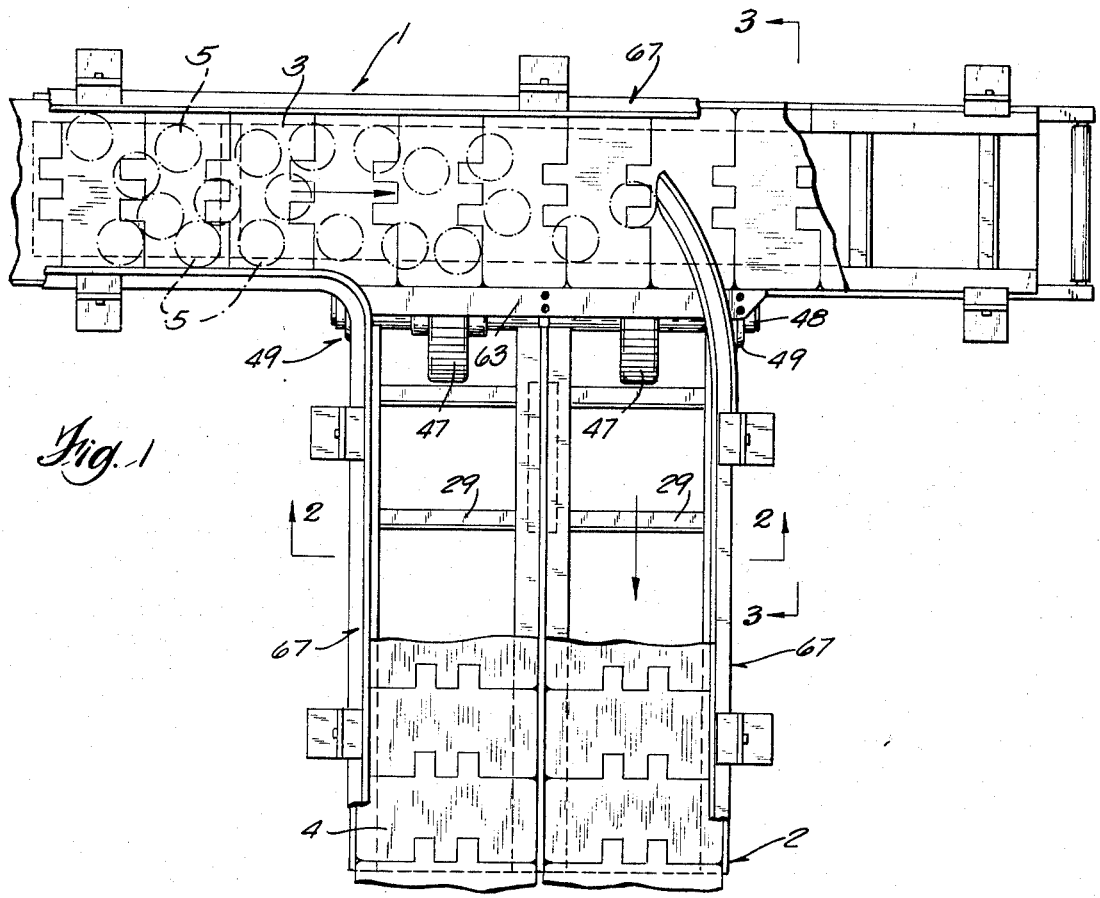
FIG. 1 is a plan view of a portion of a conveyor incorporating the present invention.
Figure 2:
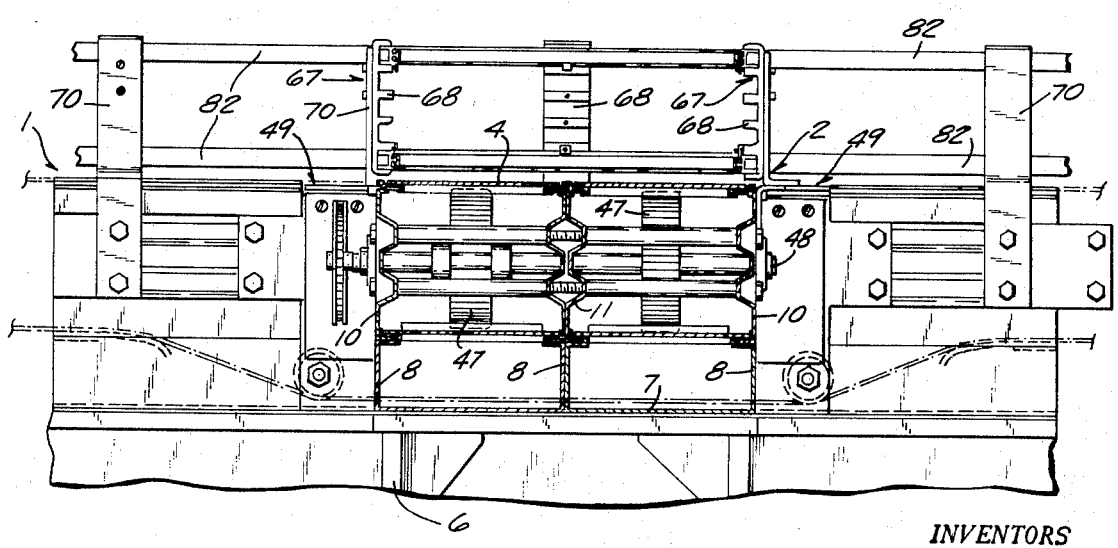
FIG. 2 is a vertical section taken along line 2—2 of FIG. 1.

The drawings illustrate a conveying mechanism which is particularly adaptable for conveying cans or bottles in a bottling plant. The conveyor includes a pair of conveyor sections 1 and 2 which are disposed perpendicular or normal to each other. A conventional table top link chain 3 is mounted for endless movement on the conveyor section 1, while a similar table top chain 4 is mounted for endless movement on the section 2. A series of bottles or cans 5 are adapted to be conveyed over the conveyors as indicated by the arrows, with a portion of the cans 5 being conveyed continuously along the section 1, while a second portion of the cans are deflected by a deflector or guide strips onto the conveyor section 2.

Each conveyor section 1 and 2 includes a base 6 and a bottom plate 7 rests on the base 6 and a series of channels 8 are secured to the bottom plate by bolts 9. As best shown in FIGS. 4 and 5, side wall sections 10 and central wall sections 11 are mounted on the upper flanges of the channels 8 and are secured to the upper flanges of the channels by screws 12 which extend through the bottom flanges 13 of the walls. The side wall section 10 and central wall sections 11 are of identical construction and are preferably aluminum extrusions having a length up to perhaps 10 feet depending on the overall size of the conveyor.

To connect the wall sections 10 and 11 together in an end-to-end relation, each of the wall sections is provided with a pair of longitudinally extending grooves 14, which are bordered by diagonal surfaces 15 which diverge outwardly. As shown in FIG. 5, the diagonal surfaces 15 bordering each groove 14 are connected by surfaces 16, while a central surface 17 connects the adjacent diagonal surfaces 15 at the vertical center of the side wall.

The side walls 10 are connected in end-to-end relation by a connecting member 18 provided with a pair of longitudinal ridges or lands 19 which complement and are received within the grooves 14 of the side walls 10. Each of the ridges is formed with a pair of inclined or diagonal surfaces 20 which wedge against the corresponding diagonal surfaces 15 of walls 10. The surfaces 21 of lands 19 normally are spaced from and do not bottom against the surfaces 16 of the side walls 10. The connecting members 18 also include a thin central surface 22 which connects the ridges 19 together and bears against the surface 17 of the side wall 10.

The connecting members 18, as best shown in FIG. 3 are positioned across the joint between two side walls disposed in end-to-end relation and are connected to the respective side walls by bolts 23.

As previously mentioned, the side walls 10 and central walls 11 are of identical construction and the central walls are disposed in a back-to-back relation so that the grooves 14 in each wall face each other. The central walls 11 are connected together by connecting members 24 having longitudinal ridges or lands 25 on opposite surfaces which are received with the grooves 14 in the respective central walls. As best shown in FIG. 7 the ridges 25 are provided with diagonal or inclined surfaces 26 which wedge against the diagonal surfaces 15 of the central walls 11, and the outer surface 27 of each ridge ordinarily does not bottom against the surface 16 of the central wall 11. In addition, each connecting member 24 is provided with a central surface 28 which connects the ridges 25 and is disposed between the surfaces 17 of walls 11.

The use of the connecting plate 24 serves to accurately align the central walls 11 in a side-by-side relation as well as aligning the central walls in an end-to-end relation. The pair of ridges 25 on the connecting plate 24 provides spaced locations of alignment which increases the accuracy of alignment over a system employing a single ridge. In addition, the inclined or diagonal surfaces 26 act to wedge against the corresponding diagonal surfaces in the wall 11 to precisely center the two elements regardless of manufacturing tolerances.

To tie the side walls 10 and central walls together a series of rods 29 extend between the walls 10 and 11 and, as shown in FIG. 4, a stud 30 is threaded within the adjacent ends of the rods 29 and extends through aligned openings in the surfaces 16 of central walls 11. In addition, studs 31 are threaded within openings in the outer ends of the rods 29, and the studs 31 extend through openings in the side walls 10 and receive nuts 32. The rods 29 serve to space the side walls 10 from the central walls 11 and provide a connection between the members.

The upper ends of the wall sections 10 and 11 are provided with flanges 33, and the flanges 33 of side walls 10 face inwardly while the flanges 33 of the central walls 11 face outwardly toward the flanges on the walls 10. The flanges 33 serve as guide tracks which support the side edges of the conveyor chains 3 and 4. According to a feature of the invention, flexible plastic wear strips 34 are snapped into position in the flanges 33 and serve to support the chains 3 and 4 in endless travel. As best shown in FIG. 15, the end of each strip 34 is provided with a reverse bend 35 which engages the outer edge of the flange 33. In addition to bend 35, the opposite edge portion of wear strip 34 is provided with a downwardly extending flange 36 which terminates in a nose 37 adapted to be snapped into position in a groove 38 formed in the flange 33. The upper surface 39 of each wear strip supports the chains 3 and 4 in endless travel.

The bottom flanges 13 on walls 10 and 11 provide guide tracks for the reverse path of travel of the conveyor chains 3 and 4, and wear strips 40, made of flexible plastic material, are adapted to be snapped in position on the flanges 13.

Each wear strip 40 is provided with a downwardly extending reverse bent portion 41 which fits around the end of the flange 13 and flange 41 is provided with a nose 42 which is received within a groove 43 formed in the undersurface of flange 13. In addition, the wear strip 40 is formed with an upstanding flange 44 having a tip or nose 45 which bears against the inner surface of the walls 10 and 11, respectively.

The upper surface 46 of wear strip 40 provides a supporting surface or guide for the return run of the conveyor chains 3 and 4, as best shown in FIG. 3.

The conveyor chains 3 and 4 are driven in a conventional manner by sprockets 47 which engages hinge knuckles on the lower surface of the chain. The sprockets 47 are mounted on shafts 48 which extend transversely of the conveyor sections and the ends of the shafts 48 of the conveyor section 2 are journalled within corner brackets 49 which are connected to both the conveyor 1 and the conveyor 2.

The corner brackets 49 are best shown in FIGS. 4 and 9 and each bracket 49 includes a pair of arms 50 and 51 which extend at right-angles to one another. Arm 50 is provided with a pair of ridges or lands 52, which are similar in configuration to lands 19 and 25 and are disposed within the grooves 14 in the side walls 10 of conveyor section 1.

The arm 51 is also provided with a pair of ridges or lands 53, similar to lands 52, and the ridges 53 complement and are received within the grooves 14 in side walls 10 of conveyor section 2. The arms 50 and 51 are secured to the side walls 10 by means of bolts 54.

The arm 51 of each corner bracket 49 is provided with an opening and a bearing 55 for shaft 48 is mounted within the opening. One end of the shaft 48 extends beyond the respective bearing 55 and carries a drive sprocket 56 which is connected by a chain 57 to a motor or other drive source not shown. The chain 57 acts to rotate the shaft 48 to thereby drive the chain 4 of conveyor section 2 in an endless path.

The chain 3 which is mounted on conveyor 1 is driven in a similar manner by sprockets and a motor not shown in the drawings.

The corner bracket 49 is provided with a pocket 58 and the sprocket 56 is adapted to rotate within the pocket. The pocket 58 is defined by a generally curved wall 59 which extends downwardly and terminates in a flange mounted on the channels 8. As best shown in FIG. 3, the wall 59 is located beneath the upper path of travel of the chain 3 and to support the chain, an angle bracket 60 is secured to the upper end of the wall 59 of each corner bracket 49 by a series of bolts. A plastic wear strip 61 is snapped over the upper end of the horizontal flange of the bracket 60 and provides a guide surface for the edge portion of the chain 3. As best shown in FIG. 1, the angle bracket 60 and wear strip 61 extend between the corner brackets 49 and have a length slightly greater than the width of conveyor section 2.

Each angle bracket 49 is also provided with an upwardly extending boss 62 and a transverse support strip 63 is secured by screws to each boss 62. As shown in FIG. 1, the strip 63 extends completely across the conveyor section 2, and as shown in FIG. 3, acts to enclose the gap between the side edge of conveyor chain 3 and the conveyor chain 4 which is moving upwardly from the drive sprocket 47.

As the return run of the conveyor chains 3 and 4 are normally in the same plane, a provision is made to deflect a portion of the return run of chain 3 so it will not interfere with the chain 4. As shown in FIG. 3, roller 64 is journalled on the lower end portion 65 of each wall 59 of the angle brackets 49, and a corresponding pair of rollers 66 are journalled on the wall 10. The chain 3 is mounted beneath the rollers 64 and 65 so that the lower or return run of the chain 3 is deflected out of its normal plane to a position where it will not interfere with the return path of travel of the chain 4.

The bottles or cans 5 which travel on the conveyors 1 and 2 are guided by guide rail assemblies 67 attached to the side edges of the conveyors 1 and 2. As shown in FIG. 5, each guide rail assembly 67 includes a support bracket 68 which extends upwardly from the conveyor section and is connected by bolts 69 to an angle support 70. The lower flange 71 of support 70 is connected by bolts 72 which extend through slots 73 in flange 71 to the upper flange 74 of brackets 75. The bracket 75 is mounted against the outer surface of the connecting plate 18 by the studs 23 which extend through vertical slots 76 in the bracket 75. The brackets 68 are spaced at intervals along the length of the conveyors 1 and 2 and each bracket 68 is provided with a series of horizontal grooves or recesses 77, with four recesses being shown in the drawings. Channel-shaped strips 78, formed of aluminum, or the like, are disposed in the lowermost recess 77 as well as in one or more of the three upper recesses. The strips 78 extend the length of the conveyor, and each strip 78 is provided with a pair of flanges 79 which extend within the recesses 77, and with a generally T-shaped head 80. The strips 78 are retained within the recesses 77 by nuts 81 which are engaged with the ends of the bolts 69. The peripheral edges of the nuts engage the side edges of the strips 78 to retain the strips within the recesses.

A flexible plastic bumper strip 82 is secured to strips 78 and the bumper strips 82 are provided with internal recesses which receive the T-shaped heads 80. As the bottles or cans are moved along the conveyors 1 and 2, the bumper strips 82 serve to guide the bottles in movement.

In normal operation only one strip 78 and bumper strip 82 is associated with the upper recesses 77, and the position of the strip 78 depends on the bottles or can height. If, however, the conveyors are to be used for bottles or cans having varying heights, then the metal strips 78 as well as the bumper strips 82 can be located in all of the three upper recesses 77, as shown in FIG. 5.

A provision is made to adjust the positions of the brackets 68 and bumper strips 82 in a lateral direction to define the width of the conveying surface. Due to the slotted connection provided by the bolt 72 and slot 73, the brackets 68 can be moved laterally inward a distance equal to the length of the slot 73 and this provides a degree of lateral adjustment for the brackets. If greater lateral adjustment is required, the brackets 75 can be removed and reversed as shown by the phantom lines in FIG. 5, so that the upper flange 74 extends inwardly over the conveyor. The slots 76 in the bracket permit the bracket to be adjusted vertically to accomodate this reversal of position. With the flanges 74 reversed, the bracket 68 will then be located a considerable distance inwardly of the sides of the conveyor section, as shown in the phantom lines in FIG. 5.

FIGS. 10 and 11 illustrate a modified form of the invention in which the conveyor 1 terminates adjacent the end of the conveyor 2, rather than extending beyond the conveyor 2, as in the first embodiment. The conveyors 1 and 2, as shown in FIGS. 10 and 11, are constructed of a series of conveyor sections similar to that described with respect to the first embodiment.

In this embodiment, the conveyor 1 comprises a pair of conveyor sections, each of which includes an endless conveyor chain 3. The chain 3 is driven by sprockets 84, similar to sprockets 47 of the first embodiment. The sprockets 84 are mounted on a horizontal shaft 85 which is journalled within end plates 86. The outer end of the shaft 85 carries a sprocket and slip clutch assembly 87 which is connected by a chain 88 to a motor or speed reduction unit, nor shown.

Each of the end plates 86 includes a vertical column 89 which is mounted on the channels 8 and a horizontal arm 90 projects from each column 89. As shown in FIG. 11, the end of the side wall 10 of the conveyor section 1 abutt the vertical side edge of the column 89, and the arm 90 is provided with a pair of lands 91 which complement and are received within the grooves 14 in the side wall 10. The end plates 86 are attached to the side walls 10 by the bolts 23.

The end walls 86 located at the lateral extremities of the conveyor 1 carry conventional bearing assemblies 92 which journal the shaft 86, while the end plates 86 located centrally of the conveyor 1 are disposed in a back-to-back relation and the lands 91 of the central end plates are received within the grooves formed in the central walls 11. The land and groove connection between the end plates 86 and the conveyor section walls 10 and 11 operates to provide precise alignment between the members.

Figure 13:
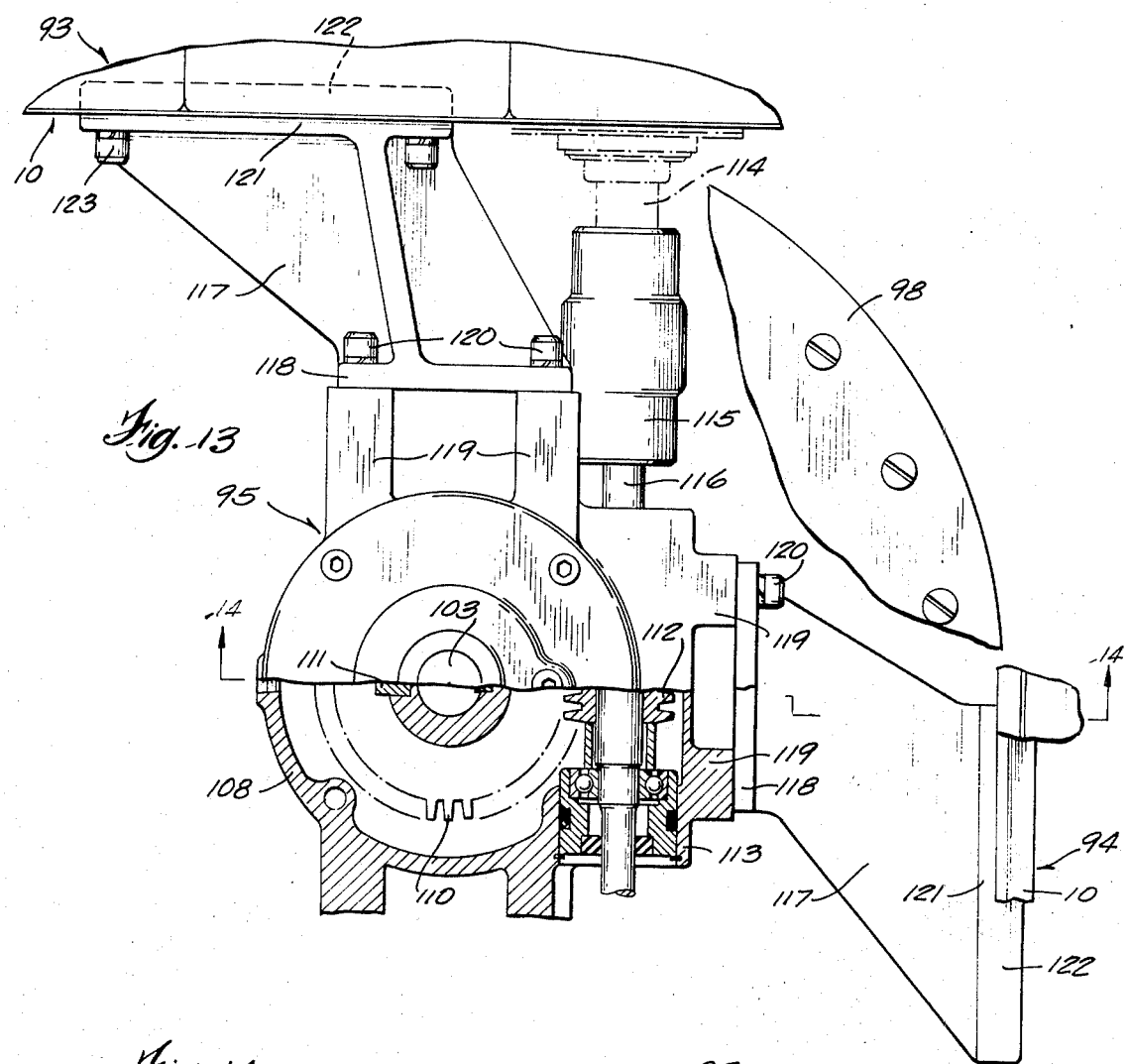
FIG. 13 is an enlarged plan view with parts broken away in section showing the disc of the conveyor of FIG. 12.
Figure 14:
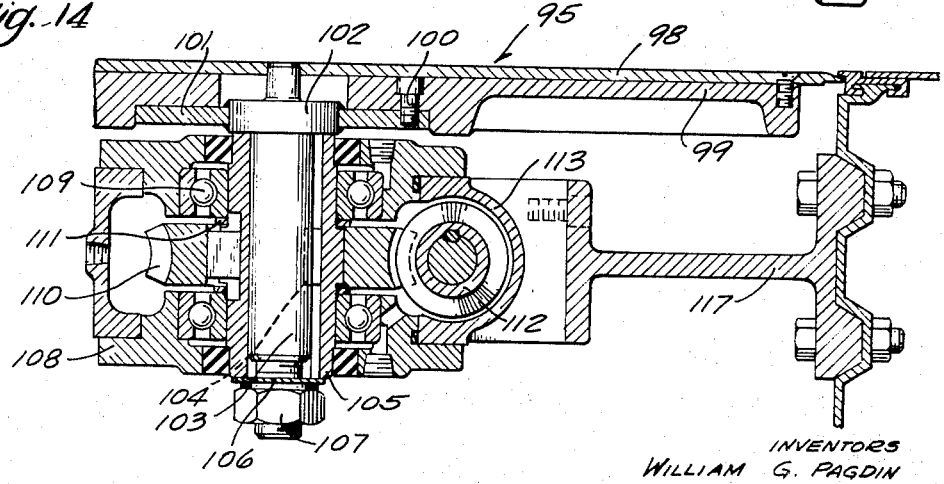
FIG. 14 is a vertical section taken along line 14—14 of FIG. 13.

FIGS. 12 to 14 illustrate another modified form of the conveyor which includes a pair of conveyor sections 93 and 94 which are disposed at right angles to each other and a rotating disc assembly 95 serves to transfer bottles or cans from the conveyor 93 to the conveyor 94. The conveyor sections 93 and 94 are constructed in a manner similar to that of conveyors 1 and 2.

As best shown in FIG. 12, the conveyor section 93 includes a table top link chain 96 while the conveyor section 94 includes a similar link chain 97, which is spaced from the chain 96 and the rotating disk 95 is located between the chains and functions to transfer the bottles or cans from the chain 96 to the chain 97.

The rotating disc assembly 95 includes an upper plate or disc 98 which is secured to a casting 99 by a series of screws and is adapted to rotate in the same plane as the upper path of travel of the link chain conveyors 93 and 94. The casting 99 is connected by bolts 100 to the horizontal flange 101 of hub 102 on shaft 103. The shaft 103 is connected by key 104 to a sleeve 105 and the sleeve is maintained in axial position on shaft 103 by washers 106 which engage the lower end of the sleeve and are held in position by nut 107 threaded onto the lower end on shaft 103.

The sleeve 105 is journalled within a housing 108 by a pair of bearings 109 and the central portion of the sleeve carries a gear 110 which is secured to the sleeve by a key 111. Gear 110 is driven by a worm 112 which is mounted for rotation within an extension 113 of housing 108.

One end of the driven shaft 114, which carries the chain sprockets, similar to sprockets 47, is connected by coupling 115 to the worm shaft 116 so that rotation of shaft 114 acts to rotate the worm 112 and hereby drive shaft 103 to rotate the disc 98.

To mount the housing 108 on the conveyor sections 93 and 94, a pair of extensions 117 extend outwardly from the housing and the extensions 117 are located approximately 90° apart. The inner flanges 118 of extensions 117 are connected to bosses 119 on housing 108 by bolts 120, and the outer flange 121 of each extension 117 is provided with a pair of parallel lands 122 which complement and are received within the grooves 14 in the side wall 10 of the respective conveyor sections 93 and 94. The flanges 121 are secured to the respective side walls 10 by a series of bolts 123.

With the construction shown in FIGS. 12 to 14, the housing 108 replaces the corner brackets 49 described in the first embodiment. The housing 108 not only functions to journal the shaft 103 but also acts to connect the two conveyor sections 93 and 94 and to accurately align the conveyor chains of the respective conveyors.

As shown in FIG. 13, the rotating disc assembly 95 operates to transfer cans or bottles from the conveyor 93 to the conveyor 94. To guide the cans across the disc 98, from conveyor 93 to conveyor 94, the guide strips 78 of guide rail assemblies 67 are curved and extend above the disc 98. One of the guide strips 78 is positioned generally tangentially to the periphery of disc 98, while the other guide strip is located between the periphery of the disc and its axis of rotation. While the cans are usually conveyed along the conveyors 93 and 94 in a number of rows, the spacing of guide strips 78 in the area above the disc 98 is such that the cans are usually transferred across the disc in single file or at most two abreast.

The conveying mechanism of the invention, while described as being utilized for conveying bottles or cans, can be adapted to convey any type of article or package. The modular construction of the conveyor sections simplifies assembly of the conveyor and provides accurate and precise alignment of the conveyor chains, thereby eliminating the "humping" of chains which may tend to knock over the bottles or can travelling on the conveyor.

The flexible plastic wear strips that support the conveyor chain both on the conveying path of travel and the return path of travel are relatively inexpensive to produce and can be installed and removed with a minimum of labor. Generally, the wear strips are replaced about once a year and as the plastic wear strips are readily installed merely by snapping them in place over the supporting tracks, the installation of the wear strips is greatly simplified.

The guide rail construction acts to support the articles in movement on the conveyor surface. The guide rails can be adjusted vertically and horizontally to provide optimum conveying conditions for the particular articles being conveyed.

I claim:

1. In a conveying mechanism, a pair of vertical walls disposed in end-to-end relation to provide a joint therebetween, each wall having at least one longitudinally extending surface deviation with a surface deviation of one wall being in longitudinal alignment with a surface deviation of the other wall, each surface deviation being bordered by a pair of flat inclined converging surfaces, a connecting member disposed across said joint and having at least one longitudinally extending surface deviation bordered by a pair of flat inclined converging surfaces complementing and mating with the first named inclined surfaces to thereby provide precise alignment of said walls relative to each other, each surface deviation in said walls includes a connecting surface connecting the inclined surfaces of that surface deviation, each surface deviation in said connecting member includes a connecting surface joining the inclined surfaces of that surface deviation and spaced out of contact with the respective connecting surfaces of the walls, means for securing the connecting member to said walls, a conveying member, and an upper ledge connected to the upper portion of each wall above the surface deviation therein to support the conveying member in travel.

2. The mechanism of claim 1, and including a lower ledge disposed in parallel spaced relation to said upper ledge and connected to said walls to support the endless member in travel in the opposite direction.

3. The mechanism of claim 2, wherein said walls are side walls members and said upper ledge and lower ledge extend laterally inward of said side walls.

4. The mechanism of claim 2, and including a flexible wear strip connected to the upper surface of both said upper ledge and said lower ledge, said conveying member adapted to be supported on said wear strips.

5. The mechanism of claim 1, wherein the surface deviation in said wall is a groove and the surface deviation in said connecting member is a ridge.

6. The mechanism of claim 5, wherein said groove extends laterally inward of said wall and the outer surface of said connecting means is flat and substantially flush with the outer surface of said wall.

7. In a conveying mechanism, a pair of first side walls disposed in end-to-end relation, each of said first side walls having a pair of longitudinally extending spaced grooves, a pair of second side walls parallel to said first side walls and disposed in end-to-end relation, each second side wall having a pair of longitudinally extending spaced grooves, a pair of first central walls disposed in end-to-end relation and located between said first side walls and said second side walls and located parallel thereto, said first central walls having a pair of longitudinally extending spaced grooves, a pair of second central walls disposed in end-to-end relation and located between said first side walls and said second side walls, each of second central walls having a pair of longitudinally extending spaced grooves, a first connecting member disposed across the joint between said first side walls and having a pair of generally parallel lands complementing and received within the grooves of said first side walls to thereby align said first side walls relative to each other, a second connecting member disposed across the joint between the second side walls and having a pair of generally parallel lands complementing and received within the grooves of said second side walls to thereby align said second side walls relative to each other, a third connecting member disposed across the joint between the first central walls and disposed across the joint between said second central walls, said third connecting member having a pair of generally parallel lands on each side surface thereof complementing and received within the grooves in the respective first central walls and the second central walls to thereby provide alignment of said first and second central walls relative to each other, and means connected to each of said side walls and central walls to support a conveying member in movement.

8. The conveying mechanism of claim 7, wherein said first central walls and said second central walls are disposed parallel to each other with the grooves in the first central walls facing the grooves in the second central walls.

9. The conveying apparatus of claim 7, wherein the portion of each wall located between each pair of longitudinal grooves is offset laterally from the remainder of the wall, and each connecting member includes a thin wall section extending between the lands and disposed flatwise with respect to said offset portion of the wall.

10. The conveying mechanism of claim 7, and including a series of connecting elements extending laterally of the conveying member and connecting the side walls and central walls together.

11. The conveying mechanism of claim 10, and including spacing means associated with said connecting elements for spacing the central walls from the respective side walls.

12. A conveying mechanism, a pair of walls disposed in end-to-end relation to provide a joint therebetween, each wall having a generally vertical main wall section and having a pair of spaced longitudinally extending surface deviations with the surface deviations of one wall being disposed in longitudinal alignment with corresponding surface deviations of the other wall, each wall also including an offset wall section connecting said surface deviations and being offset laterally from said main wall section, each surface deviation being defined by a pair of spaced flat inclined converging surfaces, a connecting member disposed across said joint and having a pair of longitudinally extending surface deviations with each of the surface deviations of the connecting member being defined by a pair of flat inclined converging surfaces disposed to complement and mate with the inclined surfaces in said walls to thereby provide alignment of said walls relative to each other, said connecting member includes a central section connecting the surface deviations therein together, said central section being disposed flat-wise against the offset wall sections of the walls, means for securing the connecting member to said walls, an endless conveying member, and means connected to the upper portion of each main wall section for supporting the conveying member for endless travel in one direction.

13. The conveying mechanism of claim 12, wherein each surface deviation in said walls includes a connecting surface connecting the inclined surfaces of that surface deviation, each surface deviation in said connecting member includes a connecting surface joining the inclined surfaces of that surface deviation and spaced out of contact with the respective connecting surfaces of the walls.

* * * * *